Feb. 23, 1960 M. E. BIVENS 2,926,246
SYNCHRONOUS PRECISION SEQUENCE TIMER
Filed June 18, 1956 3 Sheets-Sheet 2

Inventor:
Maurice E. Bivens,
by Irving H. Marshman
His Attorney.

Inventor:
Maurice E. Bivens,
by Irving H. Marshman,
His Attorney.

United States Patent Office 2,926,246
Patented Feb. 23, 1960

2,926,246

SYNCHRONOUS PRECISION SEQUENCE TIMER

Maurice E. Bivens, Waynesboro, Va., assignor to General Electric Company, a corporation of New York Application June 18, 1956, Serial No. 591,854

19 Claims. (Cl. 250—27)

This invention relates to timing devices, more particularly to sequence timers and it has for an object the provision of a simple, reliable, accurate and improved timing device of this character.

More specifically the invention relates to sequence timers which provide a sequence of timed intervals of precise but adjustable duration, and a further object of the invention is a provision of a sequence timer in which a single multi-cathode electric valve is employed to time the duration of each of a plurality of periods of a timed sequence.

Still more specifically, the invention relates to a timer for controlling in sequence the energization of a plurality of load circuits, and it has for an object the provision of a sequence timer of this chartcer in which a single multi-cathode electric valve is employed both for the purpose of controlling the energization of the load circuits in a desired sequence and for the further purpose of counting the number of cycles of supply frequency in which control is exercised over each of such load circuits.

Another object of the invention is the provision for connection of such load circuits to selected cathodes of the multi-cathode valve by means of an array of individual selector switches of which each represents one cycle of the supply frequency so that the pattern of selector switch positions or settings provides a visual representation of the periods in which control is exercised over the energization of each such load circuit.

Since a machine may in turn be controlled by such load circuits, a further object of the invention is a determination of the mode of operation of such machine by the pattern of individual selector switch positions.

In carrying the invention into effect in one form thereof, a single multi-cathode electric valve having provisions for transferring conduction from one cathode to another in a predetermined sequence at a predetermined rate is provided for controlling the energization of a plurality of load circuits together with selector switching means for selectively connecting such load circuits to selected cathodes of the valve.

Extreme accuracy of timing is required in many industrial operations. An apt example of an industrial operation which contains a sequence of steps each of which must be precisely timed is resitance welding. In resistance welding control systems, a number of load circuits or devices require energization in a predetermined sequence in order to effect the welding cycle of:

(1) Moving the welding electrodes into forceful engagement with the metal to be welded during a time interval known as the "squeeze" time before initiating the flow of welding current.

(2) Passing a heavy current of electricity through the metal for a predetermined interval of time known as the "weld" time.

(3) Maintaining the solenoid valve energized for an interval of time, known as the "hold" time, after the termination of the welding current to hold the electrodes in forceful engagement with the metal until a homogeneous weld is formed, and (4) Separating the welding electrodes and maintaining them separated for a predetermined interval of time known as the "off" time before they are again moved into work engagement position.

Accordingly in illustrating the invention it is shown as embodied in a sequence timer which, although suitable for timing the squeeze, weld, hold and off periods of a gun-type resistance, it is also suitable for timing sequences of operation of other machines or the steps of processes or the like.

For a better and more complete understanding of the invention, reference should now be had to the following specification and to the accompanying drawings in which.

Figure 1:
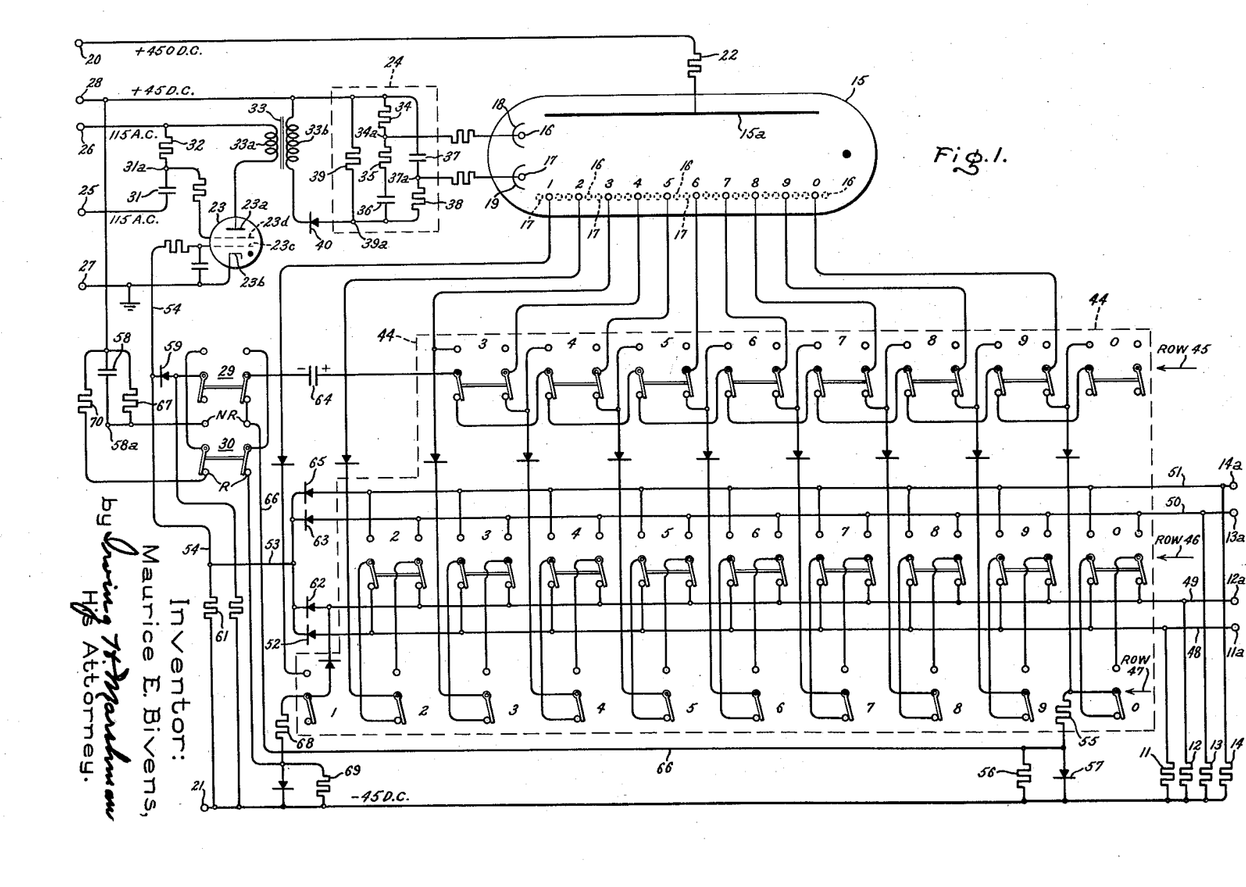
Fig. 1 is a simple schematic diagram of an embodiment of a multi-cathode electric valve sequence timer of the invention.

Referring now to the drawing, in Fig. 1 are shown a plurality of load circuits which are represented by the resistors 11, 12, 13 and 14 and their terminal connections which are to be energized for predetermined intervals of time and in a predetermined sequence.

For the control of such timed sequence, a multi-cathode type electric valve 15 is provided. This electric valve is a gas-filled cold cathode type of valve. It is provided with an anode 15a and ten main load circuit cathodes each of which corresponds to a different digit of the digital order 0–9. Preferably, these cathodes are arranged in a circle equally spaced from each other. For the purpose of transferring conduction from one cathode to another, a plurality of pairs of guide electrodes 16 and 17 are provided. Each of these pair of guide electrodes is located between a different pair of cathodes as indicated by the dotted circles 16 and 17. However, for the purpose of facilitating illustration of external wiring connections they are conventionally and diagrammatically illustrated in the left hand end of the envelope of the valve. All of the guide electrodes 16 are electrically connected together by a conducting ring 18 and similarly guide electrodes 17 are connected together by a conducting ring 19.

The anode 15a of the valve 15 is connected to the direct voltage supply terminal 20 of which the voltage with respect to ground is a suitable value, such for example as 430 volts positive. Similarly the load circuit cathodes are connected through the load circuits 11, 12, 13 and 14 to a direct voltage supply terminal 21 of which the voltage with respect to ground is suitable such for example as 45 volts negative. Included in the anode circuit is a voltage dropping resistor 22 having a suitable resistance such for example as .68 megohm. Load circuit resistors 11, 12, 13 and 14 may then appropriately have a value of .27 megohm each.

Transfer of conduction from one load cathode to the next in the sequence is effected by supplying successive pulses of negative voltage to the guide electrodes 16 and 17. For this purpose an exciter electric valve 23 and a resistance reactance network 24 controlled thereby is provided. Preferably, the exciter electric valve 23 is a thyratron and is provided with an anode 23a, a cathode 23b, a control electrode 23c and a shield control electrode 23d. The thyratron 23 is supplied from a suitable source of periodically varying voltage such as represented by the alternating voltage supply terminals 25 and 26 and the grounded terminal 27. The terminals 25 and 26 may be the terminals of the secondary winding of a supply transformer, and the terminal 27 may be a grounded mid tap of such secondary winding. The magnitude of the alternating voltage across terminals 25 and 26 may be any suitable value such for example as 230 volts so that between each of the terminals and ground there is an alternating voltage of 115 volts. As shown, the anode 23a is connected to alternating voltage supply terminal 26 and the cathode 23b is connected to the grounded terminal 27.

To the main control electrode 23c a direct voltage is supplied from the direct voltage supply terminal 28 to which the control electrode may be connected through the contacts of an "initiate" switch 29 and a "repeat" switch 30. The voltage of the supply terminal 28 may be any suitable value such as 45 volts positive with respect to ground. Connected across the alternating voltage supply terminals 25 and 26 is a static phase-shift circuit which comprises a series combination of capacitor 31 and resistor 32 to the common terminal 31a of which the screen control electrode 23d is connected. Preferably, the constants of the phase-shift circuits are designed to produce at the common terminal 31a voltage which lags the voltage at the supply terminal 25 approximately 150 degrees. Consequently the thyratron 23 can become conducting only late in the positive half cycle of its anode voltage, e.g. in the last 30 degrees.

Connected in the anode circuit of the thyratron is a primary winding 33a of an anode transformer 33 of which the secondary winding is connected to supply a pulse of voltage to the resistance-reactance network 24. As shown, this network comprises two resistance-reactance branches of which the first comprises the resistors 34 and 35 and the capacitors 36 connected in series relationship and in the order named across the terminals of the secondary winding 33b. The second resistance reactance branch of the network comprises the capacitor 37 and the resistor 38 connected in series and in the order named across the secondary terminals. It is to be noted that the positions in the two branches of the capacitors 36 and 37 are reversed with respect to the terminals of the secondary winding. This has an important effect in the operation of transferring conduction from one cathode to the next. Also connected across the secondary winding is a resistor 39 between the terminal 39a of which and the lower terminal of the secondary winding, is connected a rectifier 40 which is poled to produce a rectified voltage drop across the resistor 39 which is negative at the terminal 39a. The upper terminals of secondary winding 33b, resistors 34 and 39 and capacitor 37 are all directly connected to the 45 voltage positive direct voltage supply terminal 28. Thus, for each pulse of conduction of thyratron 23 there appears across the resistor 39 a negative pulse of voltage which is graphically represented in Fig. 2 by the curve 41 of which ordinates represent the voltage at the negative terminal 39a. This voltage is also applied across the branch which includes the capacitor 36 and the branch which includes the capacitor 37. Since the voltage across the capacitor 36 cannot change instantaneously owing to the resistors 34 and 35 in its charging circuit the voltage at terminal 34a which is represented by the curve 42, at first follows the voltage of terminal 39a but is diminished by the voltage division which is accomplished by the resistors 34 and 35. As the capacitor begins to charge, the voltage at terminal 39a, after attaining its maximum negative value 42a, rapidly becomes less negative as indicated by the steeply rising portion of curve 42. This negative pulse of voltage is supplied to the guide electrode 16 of the multi-cathode valve.

Figure 2:
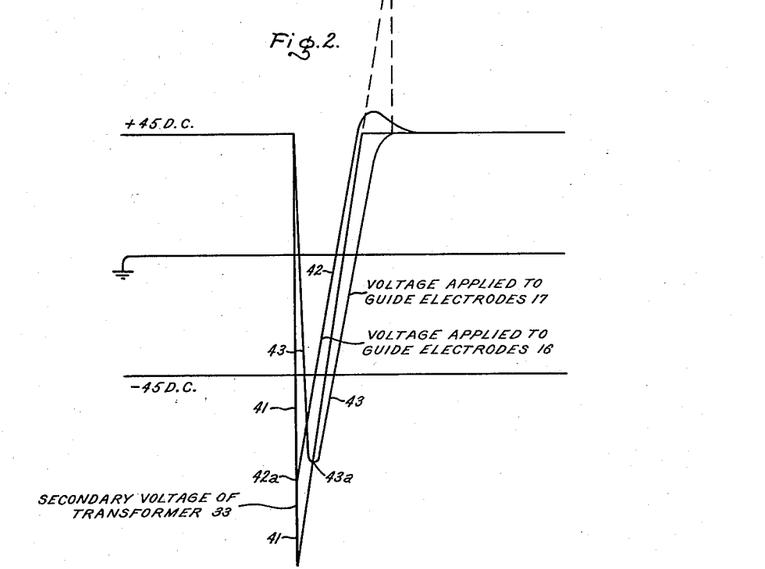
Fig. 2 is a chart of characteristic curves which facilitates an understanding of the transfer of conduction from one cathode to the next of the multi-cathode electric valve.

In response to the voltage which is applied to the other branch, the capacitor 37 charges and the polarity at its terminal 37a becomes increasingly negative as represented by curve 43. The resistor 38 in series with capacitor 37 is relatively small and consequently capacitor 37 charges rapidly and the voltage at terminal 37a quickly attains its maximum negative value 43a and thereafter rapidly becomes less negative as represented by the steeply rising portion of curve 43. The voltage at terminal 37a as represented by curve 43 is applied to guide electrode 17 of the multi-cathode valve. Thus for each half cycle of conduction of valve 23 which occurs once for each cycle of the supply frequency, there are applied in rapid succession to the guide electrodes 16 and 17 negative pulses of voltage having maximum negative values 42a and 43a which are dephased with respect to each other approximately 15 degrees with the negative value represented by point 43a lagging the negative value represented by point 42a.

The manner in which conduction is transferred from one load circuit cathode of the valve to another is briefly as follows:

Assuming a cycle of the supply voltage in which conduction is established at any one of the load circuit cathodes e.g. the digit 2 cathode through any one of the load circuit resistors e.g. resistor 11, the voltage at the digit 2 cathode will, owing to the voltage drop across the active resistor 11, be positive with respect to ground by a suitable amount e.g. 45 volts. The guide electrodes 16 and 17 are at 45 volts positive voltage with respect to ground when valve 23 is not conducting. When the valve 23 becomes conducting near the end of the next positive half cycle of the supply voltage, a negative pulse of voltage 42a having a maximum of some suitable value between 60 and 90 volts negative with respect to ground is supplied to all guide electrodes 16. As the potential difference between the anode and the guide electrode 16 adjacent the digit 2 cathode becomes sufficiently great owing to the proximity of the ionized gas, conduction is established at such guide electrode. Since only a constant tube drop voltage can exist between the anode and the guide electrode, the anode voltage follows the negative going voltage of the guide electrode 16. This reduces the voltage between the anode and the conducting digit 2 cathode until it is insufficient to maintain the discharge and conduction at the cathode is extinguished. While the voltage of guide electrode 16 is becoming decreasingly negative in accordance with the rising portion of the curve 42 after attaining its maximum negative value 42a, the voltage of the guide electrodes 17 are becoming increasingly negative in accordance with the descending portion of curve 43. Finally, an instant is reached when the voltage difference between the anode and guide electrode 17, between the conducting guide electrode 16 and the digit 3 cathode, becomes greater than the striking voltage. Consequently, conduction is established at such guide electrode 17, and since the negative voltage applied to guide electrode 16 continues to decrease, and the voltage of the anode again follows the negative going voltage of the guide electrode 17 the voltage between the anode and electrode 16 becomes less than the value required to maintain conduction. As the voltage of guide electrode 17 becomes decreasingly negative after attaining its maximum negative value, it becomes less negative than the cathodes of the valve, and owing to the proximity of the ionized gas, conduction is established at the digit 3 cathode. The above described transfer of conduction is known to the art as an autotransfer. In accordance with the rising portion of the curve 43 the voltage of the conducting guide electrode 17 becomes decreasingly negative until finally it becomes less than the maintenance value and conduction is extinguished at the guide electrode 17. In the next positive half cycle of the supply frequency the above-described transfer operation is repeated and conduction is transferred from the digit 3 cathode to digit 4 cathode, and in each succeeding positive half cycle it is transferred to the next cathode.

For the purpose of selectively connecting load circuits 11, 12, 13 and 14 to selected cathodes or selected groupings of cathodes and for terminating a sequencing cycle after a selected number of cycles of supply frequency, an array 44 of individual selector switches is provided. The selector switches in this array are arranged in three horizontal rows 45, 46 and 47 and the switches in the rows are arranged in ten columns which correspond to the digits of the 0–9 digital order. The individual selector switches may be of any suitable type. Manually operated snap switches of the toggle variety are entirely satisfactory. In rows 45 and 46 the individual selector switches are double poled double throw whereas those in row 47 are single pole double throw.

To each of the load circuits 11, 12, 13 and 14 individual buses 48, 49, 50 and 51 are respectively connected and to each of these buses in turn are connected corresponding stationary contacts of the selector switches in row 46. For example to the bus 48 are connected the lower left hand stationary contacts and to the bus 49 are connected the lower right hand contacts of the switches in row 46. Similarly, to bus 51 are connected the upper left hand stationary contacts and to bus 50 are connected the upper right hand stationary contacts.

The cathodes 1–9 inclusive of the multi-cathode valve 15 are individually connected indirectly to the movable contacts of the digitally corresponding single poled switches in row 47 and suitable rectifiers such for example as selenium dry disk rectifiers are included in the connections. Thus, by selective operation of the switches in rows 46 and 47 any one of the load circuits 11–14 inclusive may be connected to any one of the cathodes 1–9, or to any group thereof. For one example, the load circuit 12 may be connected to the digit 2 cathode by operating the selector switch in the digit 2 column of row 47 to its upper position and leaving the selector switch in the digit 2 column of row 46 in its lower position. Similarly, by additionally operating to their upper positions the row 47 switches in the digital columns 3 and 4 and leaving the row 46 switches in the same columns in their lower positions, the load circuit 12 is also connected to the digit 3 and digit 4 cathodes and thus the load circuit 12 will be energized for the three cycles of the supply during which conduction is successively established at the cathodes of the digit 2, digit 3 and digit 4 group. Thus by means of selector switches 46 and 47 load circuit 12 may be connected to grouping of cathodes.

With the foregoing understanding of the elements and their organization, the operation of the timer to time a desired sequence of energization and deenergization of the load circuits will readily be understood from the following detailed description.

By means of the selector switches in rows 46 and 47, which provide four different circuit combinations, any one of the cathodes may be connected to any one of the load circuits 11, 12, 13 and 14. With the digit 2 switches in rows 46 and 47 in their lower positions as shown in the drawing, the digit 2 cathode is connected to the load circuit 11. As explained at a preceding point in this specification, with the row 47 switch operated to its upper position and the row 46 switch left in its lower position the cathode is connected to bus 49 and thus to load circuit 12. Similarly, by operating both the row 46 and row 47 switches to their upper positions, the cathode is connected to bus 50 and thus to load circuit 13. In the only remaining alternative, with the row 47 switch in its lower position and the row 46 switch in its upper position the cathode is connected to bus 51 and load circuit 14.

When the valve 15 is first connected to the supply source conduction will immediately be established between the anode and one of the cathodes at random. Assume for example that conduction is established at digit 7 cathode, the circuit is traced from the positive terminal 20 of the anode, cathode 7, contacts of digit 6 switch in row 45, contacts of digit 7 switches in rows 47 and 46, bus 48, load circuit 11 to the negative supply terminal 21. Owing to the voltage drop across load circuit resistor 11, the upper terminal 11a becomes positive with respect to ground and this positive voltage is supplied to the control electrode 23c of the thyratron over the following circuit: bus 48, rectifier 52 and conductors 53 and 54. As a result, the thyratron fires on the next positive half cycle of its anode voltage and effects transfer of conduction successively to the digit 8, digit 9 and digit 0 cathode in the manner explained in the foregoing. Conduction will not be transferred from the digit 0 cathode to the digit 1 cathode because the digit 0 cathode is not connected to bus 48 but is connected to its own individual load circuit which includes the series parallel combination of resistors 55 and 56 and rectifier 57. Since this load circuit is not connected to the control electrode of the thyratron, the thyratron is not fired in the next positive cycle of its anode voltage to transfer conduction from the digit 0 cathode to the digit 1 cathode. Thus irrespective of the cathode at which conduction is initially established, it is quickly transferred to the digit 0 cathode which remains conducting until the initiate switch 29 is closed.

Assume a timed sequence in which the load circuit 12 is to be energized only for the first two cycles of a succession of cycles of supply frequency, the load circuit 13 is to be energized for the third, fourth and fifth cycles only, and the load circuit 14 for the sixth and seventh cycles only. Normally, all selector switches in the array are in their lower positions in which they are illustrated in Fig. 1. The switches in the digit 1 and digit 2 column of row 47 are moved to the upper positions to provide for energization of load circuit 12 for the first two cycles. To provide for energization of load circuit 13 for the third, fourth and fifth cycles, the switches in the digit 3, digit 4 and digit 5 columns of rows 46 and 47 are moved to their upper positions. To provide for energizing load circuit 14 for sixth and seventh cycles the digit 6 and digit 7 switches in row 46 are moved to their upper positions while the corresponding digit 6 and digit 7 switches of row 47 are left in their normal i.e. lower positions.

If the timing sequence is to be terminated at the end of the seventh cycle of the supply frequency, the digit 7 switch in row 45 is moved to its upper position, and if the sequence is not to be repeated the switch 30 is moved to its non-repeat position which in Fig. 1 is designated N.R.

The timing sequence is initiated by closing the initiate switch 29 to its upper position in which the control electrode 23c of the thyratron is connected to the positive supply terminal 45 through rectifier 59, initiate switch 29, switch 30 in the N.R. position and capacitor 58 to positive supply terminal 28. Since the voltage across the capacitor 58 cannot change instantly, the positive voltage of terminal 28 is supplied to control electrode 23c. In response to this the thyratron fires near the end of the first positive half cycle of anode voltage during which the initiate switch is closed or which follows the closing of the initiate switch and causes the conduction to be transferred from the digit 0 cathode to the digit 1 cathode in the previously described manner. The conducting circuit is traced from the digit 1 cathode, row 47 digit 1 switch (in the upper closed position) bus 49 and load circuit 12 to negative supply terminal 21, thereby energizing load circuit 12 for the first half cycle of the sequence of supply frequency cycles represented by the alternating voltage wave 60 in Fig. 4.

Figure 4:
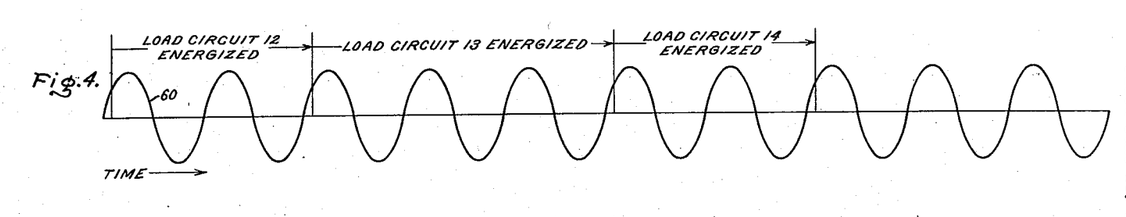

During the first cycle of supply voltage in which the initiate switch is closed, the capacitor 58 in the control electrode circuit charges through the following charging circuit, switches 30 and 29, rectifier 59 and resistor 61 to the negative supply terminal 21 with the result that capacitor terminal 58a becomes negative with respect to ground and is thus rendered incapable of firing thyratron 23 in the second half cycle of the voltage wave 60 and in subsequent half cycles as long as the initiate switch is maintained closed. However, as a result of the connection of control electrode 23c through conductor 53, rectifier 62 and bus 49 to positive load circuit terminal 12a, the thyratron is again fired in the second cycle and conduction is transferred from the digit 1 to the digit 2 cathode. Consequently the load circuit 12 is maintained energized in the second cycle of supply frequency which is represented by curve 60. In the same manner as before, conduction is transferred from the digit 2 cathode to the digit 3 cathode. The conducting circuit is traced through the contacts of the digit 3 switches in rows 46 and 47 in their upper positions, bus 50 to load circuit 13. Transfer of conduction from digit 2 cathode to the digit 3 cathode results in deenergization of load circuit 12. The positive voltage at load circuit terminal 13a which results from the flow of current in load circuit 13 is supplied through rectifier 63 to the control electrode 23c thereby causing the thyratron 23 to fire in the third, fourth and fifth cycles of line frequency to transfer conduction in successive cycles to the digit 4, digit 5 and digit 6 cathodes. As a result of conduction at cathodes 3, 4 and 5, the load circuit 13 is maintained energized during the third, fourth and fifth cycles of line frequency and is deenergized as conduction is transferred to the digit 6 cathode in the sixth cycle as indicated in Fig. 4. Conduction at cathode 6 is established through the row 47 digit 6 switch in its lower position and the row 46 digit 6 switch in its upper position and bus 51 to load circuit 14. In the seventh cycle conduction is established at cathode 7 and through the digit 7 switches in rows 47 and 46. Thus the load circuit 14 is energized during the sixth and seventh cycles as indicated in Fig. 4.

Establishment of conduction at cathode 7 completes a charging circuit for the capacitor 64 through the row 45 digit 6 sequence terminating switch (in lower position) and the contacts of digit 7 terminating switch (previously operated to its upper position) and thence through the interconnected left hand contacts of the digits 5, 4, 3 sequence terminating switches, capacitor 64, contacts of initiate switch 29 and contacts of switch 30 in the N.R. position, conductor 66 and rectifier 57 to the negative voltage supply terminal 21. Energization of the load circuit 14 causes a positive voltage to be supplied from the positive terminal 14a through rectifier 65 to the control electrode of the thyratron which, as before, supplies successive negative voltage pulses to guide electrodes 16 and 17. As conduction is established at the guide electrode 16 between the digit 7 and digit 8 cathodes it is extinguished at the digit 7 cathode and current flow in the load circuit 14 ceases and thereby reduces the voltage of terminal 14a to that of the negative supply terminal 21, i.e. −45 volts. The positive terminal of capacitor 64 is connected to the negative supply terminal 21 through the row 45 digit 3, 4, 5 and 6 sequence terminating switches (in their lower positions) and digit 7 switch (in its upper position) the digit 7 switches of rows 46 and 47 and load circuit 14. Since the capacitor is fully charged, its negative terminal is negative with respect to the negative supply terminal by the full amount of the charge on the capacitor which may be assumed to be 80 volts. Owing to the connection of the negative terminal of the capacitor through the initiate switch and N.R. contacts of switch 30 and conductor 66 to the junction point of resistors 55 and 56 in the digit zero cathode circuit, the voltage of the digit zero cathode is made 80 volts negative with respect to the other cathodes and consequently conduction is transferred directly to the digit zero cathode in response to firing of thyratron 23 in the eighth cycle of line voltage represented by curve 60 in Fig. 4. Because there is no connection between the load circuits of the digit zero cathode and the control electrode of the thyratron, the thyratron is not fired again and the digit zero cathode remains conducting until the initiate switch is released to permit capacitor 58 to discharge through its discharge resistor 67 to place the timer in a reset condition for another timing sequence such as just described.

The sequence just described would have been completed even if the initiate switch had been released at any point in the sequence. The reason for this is that the feedback circuit from the load circuits 11, 12, 13 and 14 are completed through rectifiers 52, 62, 63 and 65 to the control electrode 23c of the exciter thyratron 23 entirely independent of the contact of the initiate switch 29. Consequently even if the switch 29 had been released, the thyratron 23 would have been fired in each successive positive half cycle of anode voltage and conduction would have been shifted from one cathode to the next in the manner described. Likewise, the direct transfer of conduction of the cathode from the digit 7 cathode to the digit 0 cathode would have taken place even if the initiate switch had previously been released since in this case the charging circuit of the capacitor 64 which effects the transfer to the digit zero cathode would have also been completed through the contacts of the initiate switch in its normal, i.e. lower position.

If it is desired to cause the timing cycle to repeat itself automatically at the end of each completely timed sequence, the switch 30 is moved to its R position in which its right hand contacts connect the negative terminal of capacitor 64 to the junction point of resistors 68 and 69 which are serially connected in the digit 1 cathode circuit. Consequently at the end of a timing sequence, conduction is transferred directly from the highest numbered selected cathode to the digit 1 cathode instead of the digit 0 cathode in the previous example. The left hand contact of switch 30 in the R position connects the control electrode at 23c of the thyratron through resistor 70 to the positive supply conductor 28 with the result that the thyratron fires in each positive half cycle of its anode voltage to transfer conduction from one cathode to the next in digital sequence until conduction is transferred from the highest selected cathode to the digit 1 cathode. This is continued and the sequence is repeated as long as the initiate switch is maintained closed. If the initiate switch is released at an intermediate point in a sequence, that sequence is completed, for although the connection of the cathode 23c to the positive supply terminal 28 is interrupted at the contacts of the initiate switch, positive voltage is fed back from the load circuits through the rectifiers 52, 62, 63 and 65 to the control electrodes of the thyratron so that it continues to fire in successive cycles until the sequence is completed by the transfer of conduction from the highest selected cathode to the digit 0 cathode.

Figure 3:
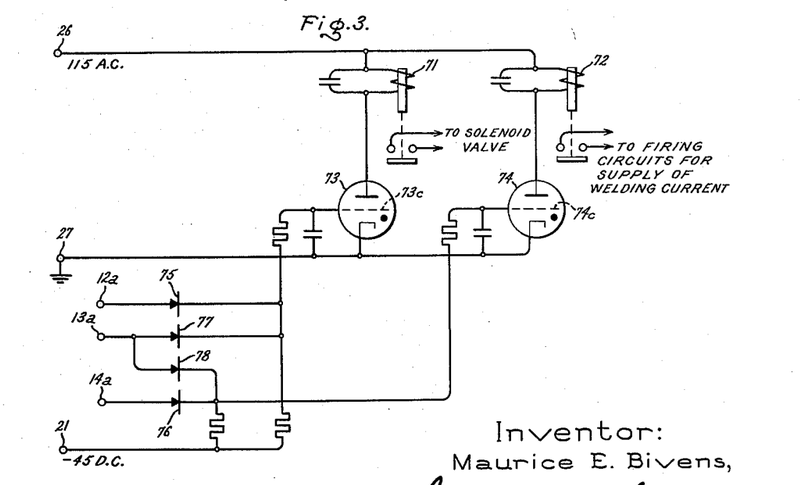
Fig. 3 is a simple schematic diagram which illustrates the connection of controlled elements of a resistance welding machine to the timed output or the load circuits of the timer of Fig. 1, and Figs. 4, 5, 6 and 7 are charts of characteristic curves which illustrate different modes of operation of a welding machine under the control of the timer of Fig. 1.

The combination of the sequence timer of Fig. 1 with the controls of a resistance welding machine is illustrated in Fig. 3 in which the operating coil 71 of the solenoid valve relay and the operating coil 72 of the weld relay are connected in the anode circuit of two electric valves 73 and 74 respectively. Preferably, these valves are thyratrons and are supplied from the alternating voltage supply terminals 26 and 27 which are the same as the terminals 26 and 27 of Fig. 1. The control electrode 73c of thyratron 73 is connected through rectifier 75 to the terminal 12a of load circuit 12. Similarly, the control electrode 74c of thyratron 74 is connected through rectifier 76 to the terminal 14a of load circuit 14 and both control electrodes 73c and 74c are connected in common to terminal 13a of load circuit 13 through rectifiers 77 and 78.

Assume that the material to be welded requires the following welding cycle.

|  | Cycles |
|---|---|
| Squeeze | 2 |
| Weld | 3 |
| Hold | 1 |
| Off | 2 |

In row 47, the digit 1 and digit 2 selector switches are operated to their upper positions for the two cycles of squeeze period. For the three cycle weld period the digit 3, 4 and 5 switches for rows 46 and 47 are operated to their upper positions. The hold period of one cycle is provided by moving the digit 6 switch in row 47 to its upper position. For the off period of two cycles the digit 7 and digit 8 switches in rows 46 and 47 are left in their lower positions and the digit 8 sequence terminating switch in row 45 is operated to its upper position.

For a single timing sequence, the switch 30 is moved to its upper N.R. position. The sequence is initiated by closing the initiating switch.

Figure 5:
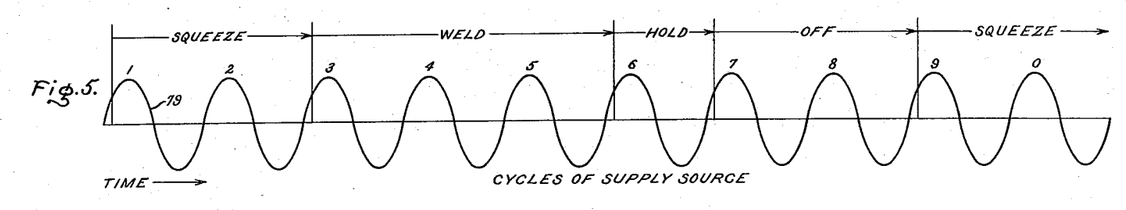

In the positive supply half cycle of the supply voltage in which the initiate switch is closed, the load circuit 12 is energized to apply a positive voltage to the control electrode of thyratron 73 which becomes conducting and picks up the solenoid valve relay to effect forceable engagement of the welding electrodes with the work. This point marks the beginning of the squeeze period as indicated in Fig. 5 in which the sinusoidal curve 79 represents a succession of ten cycles of the supply source voltage following the closing of the initiate switch. The load circuit 12 is deenergized at the end of two cycles. For the next three cycles the load circuit 13 is energized and applies a positive voltage to control electrodes 73c and 74c to render both thyratrons 73 and 74 conducting. In response to the continued conduction in thyratron 73, the solenoid valve relay is maintained energized to maintain the pressure of the electrodes on the work. The welding relay picks up in response to conduction in thyratron 74 in the third cycle of the succession to initiate flow of welding current which continues for the three cycles indicated in Fig. 5 as the weld period. At the end of the three cycle weld period, the load circuit 13 is deenergized with the result that the thyratron 74 ceases to conduct and the weld relay is dropped out to terminate the supply of welding current to the welding electrodes and thus to terminate the weld period indicated in Fig. 5. The digit 6 switch in row 47 being in its upper position and the digit 6 switch in row 46 being in its lower position the load circuit 12 continues to be energized for one additional cycle thereby maintaining the solenoid valve picked up and the electrodes forced against the work for an additional cycle indicated in Fig. 4 as the hold period.

For the next two cycles, owing to the digit 7 and digit 8 switches in rows 46 and 47 being in their lower poistion, both load circuits 12 and 13 are deenergized and the load circuit 11 is energized. Since neither thyratrons 73 or 74 is connected to load circuit 11, and since the load circuits 12, 13 and 14 are deenergized, the solenoid valve and the weld relay are deenergized with the result that no welding current is supplied to the work and the electrodes are separated from the work for these two cycles which is known as the off period as indicated in Fig. 5. At the end of the eighth cycle, conduction is transferred from the digit 8 cathode to the digit 0 cathode to leave the control in a reset condition for timing a subsequent sequence which may be initiated by releasing and reclosing the initiating switch. Release of the initiate switch at any intermediate point in the timing sequence does not interrupt the operation since positive voltages are supplied from the positive terminals of the load circuits 11, 12, 13 and 14 through rectifiers 52, 62, 63 and 65 to the control electrode 23c of the exciter thyratron to effect the transfer of conduction from one cathode to the next in each cycle of line voltage.

If repeat operation is desired, the switch 30 is operated to the repeat position and the above-described operation is repeated with the exception that at the end of the eighth cycle in each sequence, conduction is transferred from the digit 8 to the digit 1 cathode.

Figure 6:
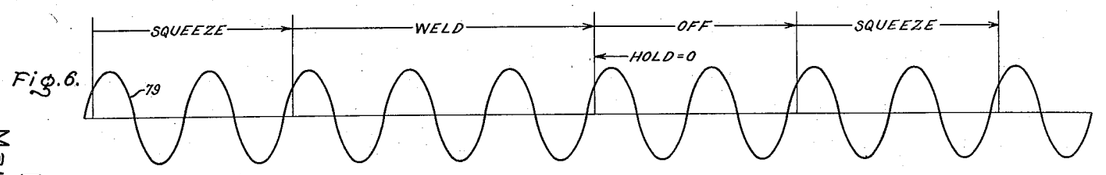

For certain categories of work a zero hold period is desired, i.e. it is desired to initiate separation of the electrodes at the end of the weld period. In this case, assuming the same squeeze, weld, and off period of 2, 3 and 2 cycles respectively, the digit 6 switch in row 47 will not be operated to its upper position but will be left in its lower position, and the digit 7 sequence terminating switch will be moved to its upper position. The remaining selector switches will be in the same positions as those in which they were set for the previous sequence with the 1 cycle hold period. With this pattern of operation of the selector switches, load circuits 12 and 13 and likewise the solenoid valve relay 71 and weld relay 72 are deenergized to effect separation of the welding electrodes at the end of the weld period as illustrated in Fig. 6, i.e. at the end of the fifth cycle and load circuit 11 is energized for the sixth and seventh cycles to provide the off period of two cycles.

It may even be desired to initiate separation of the welding electrode prior to the termination of the welding current in order to realize the maximum speed of operation of the welding machine.

Figure 7:
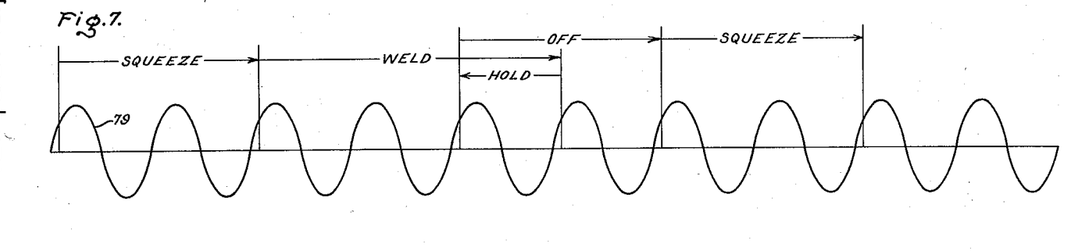

Assume for example that the squeeze, weld and off periods are to be the same as previously, i.e. 2, 3, and 2 cycles respectively, and that the welding electrodes are to be separated one cycle prior to the termination of the welding current, the digit 5 switch in row 47 will not be moved to its upper position but will remain in its lower position and the digit 6 sequence terminating switch in row 45 will be operated to its upper position. The remaining selector switches occupy the same positions which they occupied in the immediately preceding sequence. With this pattern of positions of the selector switches, the load circuits 12 and 13 are both deenergized at the end of the fourth cycle in Fig. 7. Since the control electrode of thyratron 73 is connected only to load circuits 12 and 13, it ceases to conduct at the end of the fourth cycle and the solenoid valve relay is deenergized to initiate the separation of the welding electrodes. However, since the digit 5 switch in row 46 is in its upper position, load circuit 14 is energized during the fifth cycle, and since the control electrode 74c is connected to load circuit terminal 14a, thyratron 74 is energized and the welding relay 72 remains picked up to continue the supply of welding current during the fifth cycle, i.e. the third cycle of the weld period as indicated in Fig. 7. The blocking rectifier 78 prevents thyratron 73 from responding to the energization of load circuit 14, and consequently this thyratron does not conduct during the fifth cycle. Since by definition of the National Electrical Manufacturers Association, the hold period begins at the end of the weld period, the period during which the electrodes are separated prior to the tremination of the welding current is regarded as a (negative hold) period as indicated in Fig. 7.

Although in accordance with the provisions of the patent statutes the principle of this invention has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A sequence timer comprising a pair of supply terminals, a multi-cathode electric valve connected to be supplied therefrom and having a plurality of cathodes each corresponding to a different digit in the digital order 0-9, means for progressively shifting the conduction within the valve from one cathode to another in numerical order at a predetermined rate, a plurality of load circuits, a plurality of groups of selector switches for selectively connecting selected load circuits to selected cathodes of said valve, a capacitor and connections established by one of said groups of selector switches for charging said capacitor and simultaneously connecting the negative terminal thereof to the digit 1 cathode and the positive terminal thereof to the highest numbered cathode selected by said selector switches to produce at said digit one cathode in response to the termination of conduction at said highest selected cathode a voltage negative with respect to the voltages of the other cathodes thereby to establish conduction at said digit 1 cathode.

2. A sequence timer comprising a pair of voltage supply terminals, a multi-cathode electric valve connected to be supplied therefrom and having a plurality of cathodes each corresponding to a different digit in the digital order 0-9, means for progressively shifting the conduction within the valve from one cathode to another in numerical order at a predetermined rate, a plurality of load circuits, a plurality of groups of selector switches for selectively connecting selected load circuits to selected cathodes of said valve, a capacitor and connections established by one of said groups of selector switches for connecting said capacitor between the highest numbered selected cathode and the digit 1 cathode and charging said capacitor positive and said highest numbered cathode selected thereby to render said digit 1 cathode negative with respect to the other cathodes of said valve and to establish conduction at said digit 1 cathode in response to termination of conduction at said highest numbered selected cathode.

3. A sequence timer comprising a pair of supply terminals, a multi-cathode electric valve connected to be supplied from said terminals, means for progressively transferring conduction from one of said cathodes to another in a predetermined sequence at a predetermined rate, a plurality of load circuits, selector switching means for selectively connecting said load circuits to selected cathodes of said valve, and means for transferring conduction directly from a predetermined cathode to a selected cathode in said sequence comprising means responsive to termination of conduction at said predetermined cathode for supplying to said selected cathode a voltage that is negative with respect to the voltage of the other cathodes of said valve.

4. A sequence timer comprising a pair of supply terminals, a multi-cathode electric valve connected to be supplied therefrom, means for progressively transferring conduction from one of said cathodes to another in a predetermined sequence at a predetermined rate, a plurality of load circuits, selector switching means for selectively connecting said load circuits to selected cathodes of said valve, and means for terminating a timing sequence at a predetermined one of said cathodes comprising means responsive to termination of conduction at said predetermined cathode for supplying to the first cathode in said predetermined sequence a voltage that is negative with respect to the voltage of the other cathodes to effect transfer of conduction directly from said predetermined cathode to said first cathode.

5. A sequence timer comprising a pair of supply terminals, a multi-cathode electric valve connected to be supplied therefrom, means for progressively shifting conduction from one of said cathodes to another in a predetermined sequence at a predetermined rate, a plurality of load circuits, selector switching means for selectively connecting said load circuits to selected cathodes of said valve, a repeat switch, a source of voltage, and means for transferring conduction directly from a predetermined cathode to the first cathode in said sequence comprising electrical connections established by said selector switching means and said repeat switch from said source to the first cathode in said sequence for supplying to said cathode a voltage that is negative with respect to the voltage of the other cathodes of said valve.

6. A sequence timer comprising a pair of supply terminals, a multi-cathode electric valve connected to be supplied therefrom, means for progressively shifting conduction from one of said cathodes to another in a predetermined sequence at a predetermined rate, a plurality of load circuits, selector switching means for selectively connecting said load circuits to selected cathodes of said valve, a repeat switch, and means for transferring conduction directly from a predetermined cathode to the first cathode in said sequence comprising electrical connections established by said selector switching means and said repeat switch for deriving from the load circuit of said predetermined cathode and supplying to said first cathode in response to termination of conduction at said predetermined cathode a voltage that is negative with respect to the voltage of the other cathodes of said valve.

7. A sequence timer comprising a pair of supply terminals, a multi-cathode electric valve connected to be supplied therefrom, means for progressively shifting conduction from one of said cathodes to another in a predetermined sequence at a predetermined rate, a plurality of load circuits, selector switching means for selectively connecting said load circuits to selected cathodes of said valve, a non-repeat switch, and means for transferring conduction directly from a preselected cathode to the last cathode in said sequence comprising electrical connections established by said selector switching means and said non-repeat switch and responsive to termination of conduction at said preselected cathode for supplying to said last cathode a voltage that is negative with respect to the voltage of the other cathodes of said valve.

8. A sequence timer comprising a pair of voltage supply terminals, a multi-cathode electric valve connected to be supplied therefrom and having a plurality of cathodes each corresponding to a different digit in the 0-9 order, means for progressively transferring conduction from one of said cathodes to the other in numerical order at a predetermined rate, a plurality of load circuits, selector switching means for selectively connecting said load circuits to selected cathodes of said valve and means for transferring conduction directly from the highest numbered selected cathode to the digit 1 cathode comprising means responsive to the termination of conduction at said highest numbered selected cathode for supplying to said digit 1 cathode a voltage that is negative with respect to the voltage at the other cathodes.

9. A sequence timer comprising a pair of voltage supply terminals, a multi-cathode electric valve connected to be supplied therefrom and having a plurality of cathodes each corresponding to a different digit in the 0-9 order, means for progressively transferring conduction from one of said cathodes to the other in numerical order at a predetermined rate, a plurality of load circuits, selector switching means for selectively connecting said load circuits to selected cathodes of said valve, a timing cycle repeat switch and means for transferring conduction directly from the highest numbered selected cathode to the digit 1 cathode comprising electrical connections including said repeat switch established by said selector switching means for deriving from the load circuit of said highest numbered selected cathode and supplying to the digit 1 cathode in response to termination of conduction at said highest numbered selected cathode, a voltage that is negative with respect to the voltages of the other cathodes.

10. A sequence timer comprising a pair of voltage supply terminals, a multi-cathode electric valve connected to be supplied therefrom and having a plurality of cathodes each corresponding to a different digit in the 0-9 order, means for progressively transferring conduction from one of said cathodes to the other in numerical order at a predetermined rate, a plurality of load circuits, selector switching means for selectively connecting said load circuits to selected cathodes of said valve, a timing cycle non-repeat switch, and means for transferring conduction directly to the digit 0 cathode from a preselected higher numbered cathode comprising electrical connections established by said selector switching means and said non-repeat switch and responsive to termination of conduction at said preselected cathode for supplying to said digit 9 cathode a voltage that is negative with respect to the voltages of the other cathodes of said valve.

11. A sequence timer comprising a pair of supply terminals, a multi-cathode electric valve connected to be supplied therefrom, means for progressively transferring conduction from one of the cathodes of the valve to the next in a predetermined sequence at a constant rate, a plurality of load circuits, a pair of control circuits, electrical connections from each of two of said load circuits to a corresponding one of said control circuits, connections from a third of said load circuits to both said control circuits, and selector switching means for selectively connecting said load circuits to selected cathodes of said valve to provide sequential timed operation or overlapping timed relationship of said control circuits.

12. A sequence timer comprising a pair of supply terminals, a multi-cathode electric valve connected to be supplied therefrom, means for progressively transferring conduction from one of the cathodes of the valve to the next in a predetermined sequence at a constant rate, a plurality of load circuits, a pair of control circuits, electrical connections from each of two of said load circuits to a corresponding one of said control circuits, connections from a third of said load circuits to both said control circuits, and means for transferring conduction directly from a predetermined cathode to the first cathode in said cathode sequence comprising means responsive to termination of conduction at said predetermined cathode for supplying to said first cathode a voltage that is negative with respect to the voltage of the other cathodes of said valve.

13. A sequence timer comprising a pair of supply terminals, a multi-cathode electric valve supplied therefrom, means for progressively transferring conduction from one of said cathodes to the next in a predetermined sequence at a constant rate, a plurality of load circuits, a selector switching means for selectively connecting selected load circuits to selected cathodes of said valve, a timing cycle repeat switch, means for terminating a timing sequence at a preselected one of said cathodes comprising a capacitor and electrical connections established by said selector switching means and said repeat switch for charging said capacitor and connecting the negative terminal thereof to the first cathode in said cathode sequence and connecting the positive terminal thereof to said preselected cathode to produce at said first cathode in response to the termination of conduction at said preselected cathode a voltage that is negative with respect to the voltages of the other cathodes thereby to effect transfer of conduction directly from said predetermined cathode to said first cathode.

14. A sequence timer comprising a pair of supply terminals, a multi-cathode electric valve supplied therefrom, means for progressively transferring conduction from one of said cathodes to the next in a predetermined sequence at a constant rate, a plurality of load circuits, a selector switching means for selectively connecting selected load circuits to selected cathodes of said valve, a timing cycle non-repeat switch, means for terminating a timing sequence at a preselected one of said cathodes comprising a capacitor and electrical connections established by said selector switching means and said non-repeat switch for connecting said capacitor between said pre-selected cathode and the digit 0 cathode and charging said capacitor positive at the terminal connected to said preselected cathode thereby to render said digit 0 cathode negative with respect to the other cathodes of said valve and to establish conduction at said digit 0 cathode in response to termination of conduction at said preselected cathode.

15. A sequence timer comprising a pair of direct voltage supply terminals, a multi-cathode electric valve supplied therefrom and having a plurality of load circuit cathodes and guide electrodes positioned between each pair of load circuit cathodes, a plurality of load circuits, selector switching means for selectively connecting selected load circuits to selected cathodes, means for transferring conduction from one of said load circuit cathodes to the next at a constant rate comprising a pair of periodically varying voltage supply terminals, an electric valve supplied therefrom and having an output circuit connected to said guide electrodes and an input circuit and means comprising a timing cycle repeat switch for connecting said input circuit to said direct voltage supply terminals.

16. A sequence timer comprising a pair of direct voltage supply terminals, a multi-cathode electric valve supplied therefrom and having a plurality of load circuit cathodes and guide electrodes positioned between each pair of load circuit cathodes, a plurality of load circuits, selector switching means for selectively connecting selected load circuits to selected cathodes, means for transferring conduction from one of said load circuit cathodes to the next at a constant rate comprising a pair of periodically varying voltage supply terminals, an electric valve supplied therefrom and having an output circuit connected to said guide electrodes and an input circuit, a voltage divider comprising a series connected resistor and capacitor and means comprising a timing cycle non-repeat switch for connecting said voltage divider across said direct voltage supply terminals and connecting said input control circuit to an intermediate point on said voltage divider.

17. A sequence timer comprising a pair of direct voltage supply terminals, a multi-cathode electric valve supplied therefrom and having a plurality of cathodes and guide electrodes positioned between each pair of said cathodes, a plurality of load circuits, selector switching means for selectively connecting selected load circuits to selected cathodes, means for transferring conduction from one of said cathodes to the next in predetermined sequence at a predetermined rate comprising a pair of periodically varying voltage supply terminals and an electric valve supplied therefrom and having an output circuit connected to said guide electrodes and an input circuit, means comprising a timing cycle repeat switch for connecting said input circuit to said direct voltage supply terminals and means for terminating a timing sequence at a preselected one of said cathodes comprising electrical connections established by said selector switching means and said repeat switch for deriving from the load circuit connected to said preselected cathode and supplying to the first of said cathodes in said cathode sequence in response to termination of conduction at said preselected cathode a voltage that is negative with respect to the voltages of the other cathodes of said valve to transfer conduction directly from said preselected cathode to said first cathode to initiate a repeat cycle.

18. A sequence timer comprising a pair of direct voltage supply terminals, a multi-cathode electric valve having a plurality of cathodes and intermediate guide electrodes, a plurality of load circuits, selector switching means for selectively connecting selected load circuits to selected cathodes, means for transferring conduction from one of said cathodes to the next in a predetermined sequence at a predetermined rate comprising a pair of periodically varying voltage supply terminals and an auxiliary electric valve supplied therefrom and having an output circuit connected to said guide electrodes and an input control circuit, a voltage divider comprising a series connected resistor and capacitor and means comprising a timing cycle non-repeat switch for connecting said voltage divider across said direct voltage source and connecting said input control circuit to an intermediate point on said divider, to establish conduction at a first cathode in said cathode sequence, electrical connections to said input control circuit from all cathodes except the last in said cathode sequence for causing said auxiliary valve to supply negative voltage impulses to said guide electrodes in timed relationship to the voltage at said periodically varying voltage terminals, and means for terminating a timing cycle at a preselected cathode comprising electrical connections from said preselected cathode to said last cathode for supplying to said last cathode in response to termination of conduction at said preselected cathode a voltage that is negative with respect to the voltages of the other cathodes of said valves.

19. A sequence timer comprising a pair of direct voltage supply terminals, a multi-cathode electric valve connected to be supplied therefrom and having first and second guide electrodes positioned between each pair of cathodes, and means for progressively shifting conduction from one of said cathodes to another in a predetermined sequence comprising a pair of periodically varying voltage supply terminals, an auxiliary electric valve having an output circuit supplied from said periodically varying voltage terminals and an input circuit, a transformer having its primary winding connected to be supplied from said output circuit, and means for supplying to said first and second guide electrodes in timed relationship with said periodically varying voltage, dephased pulses of voltage that are negative with respect to the voltages of said cathodes comprising a phase-shift network having two resistance-capacitance branches with the resistance and capacitance elements of the branches connected in reverse order across the terminals of the secondary winding of said transformer, an electrical connection from an intermediate point of one of said branches to all said first guide electrodes and an electrical connection from an intermediate point of the other of said branches to all said second guide electrodes.

References Cited in the file of this patent
UNITED STATES PATENTS

| | | |
|---|---|---|
| 2,379,093 | Massonneau | June 26, 1945 |
| 2,398,771 | Compton | Apr. 23, 1946 |
| 2,813,199 | Sciaky et al. | Nov. 12, 1957 |

FOREIGN PATENTS

| | | |
|---|---|---|
| 704,816 | Great Britain | Mar. 3, 1954 |

OTHER REFERENCES

Publ. (A), Electronic Engineering, October 1953, pp. 424–426, "An Electronic Batching Counter."

Publ. (B), Tele-Tech & Electronic Industries, December 1954, pp. 84–86 and page 153. "Glow Transfer Tubes for Counting."